(12) United States Patent
Hai

(10) Patent No.: US 12,372,832 B2
(45) Date of Patent: Jul. 29, 2025

(54) DISPLAY DEVICE HAVING LIQUID CRYSTAL COMPENSATION LAYER

(71) Applicant: TCL CHINA STAR OPTOELECTRONICS TECHNOLOGY CO., LTD., Guangdong (CN)

(72) Inventor: Bo Hai, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/755,534

(22) PCT Filed: Mar. 15, 2022

(86) PCT No.: PCT/CN2022/080858
§ 371 (c)(1),
(2) Date: Apr. 29, 2022

(87) PCT Pub. No.: WO2023/168729
PCT Pub. Date: Sep. 14, 2023

(65) Prior Publication Data
US 2024/0168338 A1    May 23, 2024

(30) Foreign Application Priority Data
Mar. 7, 2022    (CN) .......................... 202210218899.9

(51) Int. Cl.
  G02F 1/13363    (2006.01)
  G02F 1/1335    (2006.01)
(52) U.S. Cl.
  CPC .. *G02F 1/133633* (2021.01); *G02F 1/133531* (2021.01)

(58) Field of Classification Search
None
See application file for complete search history.

(56) References Cited

U.S. PATENT DOCUMENTS 6,295,109 B1 *  9/2001  Kubo ................ G02F 1/133553
                                                        349/147
2004/0257498 A1 * 12/2004  Uesaka ............... G02F 1/13362
                                                          349/98
(Continued)

FOREIGN PATENT DOCUMENTS

CN        1608218 A      4/2005
CN     101055366 A     10/2007
(Continued)

OTHER PUBLICATIONS

International Search Report in International application No. PCT/CN2022/080858, mailed on Nov. 25, 2022.
(Continued)

*Primary Examiner* — Ryan Crockett
(74) *Attorney, Agent, or Firm* — PV IP PC; Wei Te Chung

(57) ABSTRACT

A display device is provided. In the present application, a liquid crystal compensation layer is provided on both first polarizer and second polarizer, and an improvement of compensation value is not realized by stretching the liquid crystal compensation layer but by adjusting the refractive index difference and thickness of the liquid crystal molecules, so the adjustment range is large, the restriction is small, and it can be matched with the high phase difference of the liquid crystal display panel. Therefore, the dark state side-view light leakage of the liquid crystal display panel and the contrast ratio of the liquid crystal display panel are improved, and the image quality is enhanced.

12 Claims, 14 Drawing Sheets

(56) References Cited

U.S. PATENT DOCUMENTS

| | | | | |
|---|---|---|---|---|
| 2009/0257004 A1* | 10/2009 | Song | .................... | G02B 5/3016 |
| | | | | 349/96 |
| 2020/0271992 A1 | 8/2020 | He | | |
| 2021/0257596 A1* | 8/2021 | Tang | ................ | G02F 1/133638 |

FOREIGN PATENT DOCUMENTS

| | | | |
|---|---|---|---|
| CN | 101414023 | A | 4/2009 |
| CN | 101416085 | A | 4/2009 |
| CN | 101556350 | A | 10/2009 |
| CN | 107966846 | A | 4/2018 |
| CN | 114509898 | A | 5/2022 |
| JP | 2008249915 | A | 10/2008 |
| JP | 2012002832 | A | 1/2012 |
| TW | 200736764 | A | 10/2007 |

OTHER PUBLICATIONS

Written Opinion of the International Search Authority in International application No. PCT/CN2022/080858, mailed on Nov. 25, 2022.
Chinese Office Action issued in corresponding Chinese Patent Application No. 202210218899.9 dated Sep. 22, 2023, pp. 1-9.
Chinese Office Action issued in corresponding Chinese Patent Application No. 202210218899.9 dated Apr. 14, 2023, pp. 1-7.

* cited by examiner

DISPLAY DEVICE HAVING LIQUID CRYSTAL COMPENSATION LAYER

FIELD OF INVENTION

The present application relates to a field of display technology, and particularly relates to a display device.

BACKGROUND OF INVENTION

A side view contrast ratio of a current vertical alignment liquid crystal display device is not well, thereby affecting an image quality of a liquid crystal display device. Particularly, with development of high dynamic range imaging televisions, the requirements for a contrast ratio of a liquid crystal display device are higher, and improving the contrast ratio of the liquid crystal display device is a trend of the display panel industry in the future.

TECHNICAL PROBLEM

The side-view contrast ratio of a current vertical alignment liquid crystal display device is not well. This is mainly caused by the side-view light leakage in the dark state. As the viewing angles of a thin film transistor liquid crystal display device increase, the contrast ratio of images decreases, so the definition of the images reduces. This is because the birefringence of the liquid crystal molecules in the liquid crystal layer changes with observation angles. Using a wide viewing angle compensation film for compensation can effectively reduce the light leakage of the dark state screen and greatly improve the contrast of the screen within a certain viewing angle range. The principle of the compensation film is to compensate the phase differences generated by the liquid crystals at different viewing angles so that the birefringence properties of the liquid crystal molecules can be compensated symmetrically. However, a conventional compensation film adopts an optical compensation. The optical compensation realizes an adjustment of the compensation value by stretching the film layer. The stretching of the film layer has its limitations, so the compensation value is limited and cannot match the phase difference of the vertical alignment liquid crystal display device. Therefore, the effect of improving the side-view light leakage in the dark state of the vertical alignment liquid crystal display device is limited.

SUMMARY OF INVENTION

The present application provides a display device to solve the problem of limited improvement effect of light leakage when a vertical alignment liquid crystal display device is viewed from the side in a dark state.

The present application provides a display device, which includes: a first polarizer; a second polarizer, wherein the first polarizer is arranged opposite to the second polarizer; and a liquid crystal display panel arranged between the first polarizer and the second polarizer; wherein the first polarizer comprises a first liquid crystal compensation layer, and the second polarizer comprises a second liquid crystal compensation layer.

Optionally, in some embodiments of the present application, the first polarizer further includes: a first polarizing layer, wherein the first liquid crystal compensation layer is positioned between the first polarizing layer and the liquid crystal display panel.

Optionally, in some embodiments of the present application, the second polarizer further includes: a second polarizing layer, wherein the second liquid crystal compensation layer is positioned between the second polarizing layer and the liquid crystal display panel.

Optionally, in some embodiments of the present application, the first liquid crystal compensation layer and the second liquid crystal compensation layer comprise liquid crystal polymers.

Optionally, in some embodiments of the present application, a birefringence difference of liquid crystal molecules in the liquid crystal polymers ranges from 0.05 to 0.15.

Optionally, in some embodiments of the present application, a thickness of the liquid crystal polymers ranges from 0.01 μm to 3 μm.

Optionally, in some embodiments of the present application, the first polarizer further includes: an optical compensation layer positioned between the first polarizing layer and the liquid crystal display panel.

Optionally, in some embodiments of the present application, the optical compensation layer is positioned between the first polarizing layer and the first liquid crystal compensation layer.

Optionally, in some embodiments of the present application, the first polarizer further includes: a first support layer positioned between the first liquid crystal compensation layer and the liquid crystal display panel.

Optionally, in some embodiments of the present application, the first liquid crystal compensation layer is positioned between the first polarizing layer and the optical compensation layer.

Optionally, in some embodiments of the present application, the first polarizer further includes: a first support layer positioned between the first polarizing layer and the first liquid crystal compensation layer.

Optionally, in some embodiments of the present application, the second polarizer further includes: a second support layer positioned between the second polarizing layer and the second liquid crystal compensation layer.

The present application further provides a display device, including: a first polarizer; a second polarizer, wherein the first polarizer is arranged opposite to the second polarizer; and a liquid crystal display panel arranged between the first polarizer and the second polarizer; wherein the first polarizer comprises a first liquid crystal compensation layer, and the second polarizer comprises a second liquid crystal compensation layer; and wherein the first polarizer is configured to be a light incident side, and the second polarizer is configured to be a light-emitting side.

Optionally, in some embodiments of the present application, the first polarizer further includes: a first polarizing layer, wherein the first liquid crystal compensation layer is positioned between the first polarizing layer and the liquid crystal display panel.

Optionally, in some embodiments of the present application, the first liquid crystal compensation layer and the second liquid crystal compensation layer include liquid crystal polymers.

Optionally, in some embodiments of the present application, a birefringence difference of liquid crystal molecules in the liquid crystal polymers ranges from 0.05 to 0.15.

Optionally, in some embodiments of the present application, a thickness of the liquid crystal polymers ranges from 0.01 μm to 3 μm.

Optionally, in some embodiments of the present application, the first polarizer further includes: an optical compensation layer positioned between the first polarizing layer and the liquid crystal display panel.

Optionally, in some embodiments of the present application, the optical compensation layer is positioned between the first polarizing layer and the first liquid crystal compensation layer.

Optionally, in some embodiments of the present application, the first liquid crystal compensation layer is positioned between the first polarizing layer and the optical compensation layer.

BENEFICIAL EFFECT

The present application provides a display device, wherein the display device includes: a first polarizer; a second polarizer, wherein the first polarizer is arranged opposite to the second polarizer; and a liquid crystal display panel arranged between the first polarizer and the second polarizer; wherein the first polarizer includes a first liquid crystal compensation layer, and the second polarizer includes a second liquid crystal compensation layer. In the present application, a liquid crystal compensation layer is provided on both the first polarizer and the second polarizer, and the improvement of compensation value is not realized by stretching the liquid crystal compensation layer but by adjusting the refractive index difference and thickness of the liquid crystal molecules, so the adjustment range is large, the restriction is small, and it can be matched with the high phase difference of the liquid crystal display panel. Therefore, the dark state side-view light leakage of the liquid crystal display panel and the contrast ratio of the liquid crystal display panel are improved, and the image quality is enhanced. Furthermore, both sides of the liquid crystal display panel are provided with liquid crystal compensation layers, which comprehensively achieves a greater compensation effect.

DESCRIPTION OF DRAWINGS

In order to illustrate the technical solutions in the embodiments of the present application more clearly, the following briefly introduces the accompanying drawings that need to be used in the description of the embodiments. Obviously, the drawings in the description are only some embodiments of the present application, and for one of ordinarily skilled in the art, other drawings can also be obtained from these drawings without creative effort.

DETAILED DESCRIPTION OF PREFERRED EMBODIMENTS

Figure 1:
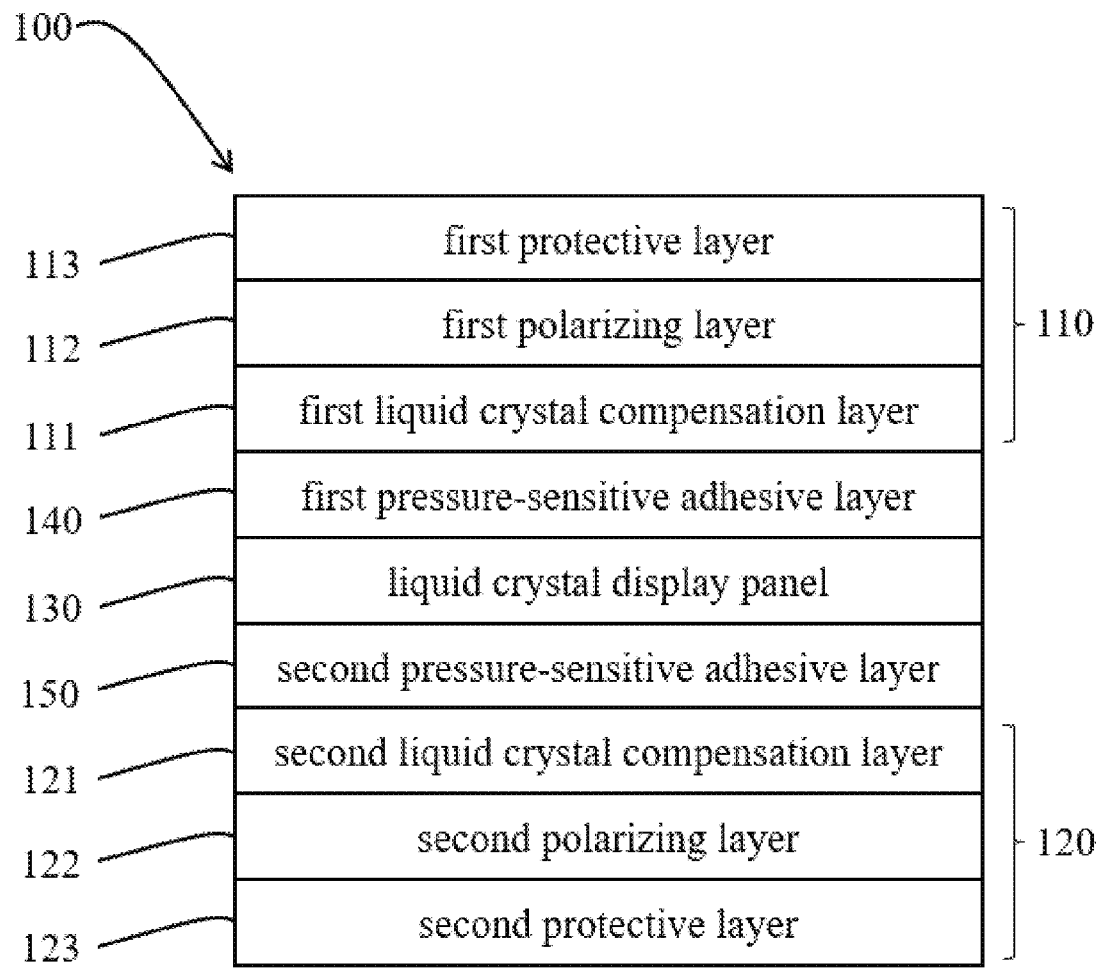
FIG. 1 is a first structural schematic diagram of a display device provided by the present application.

The technical solutions in the embodiments of the present application will be clearly and completely described below with reference to the accompanying drawings in the embodiments of the present application. Obviously, the embodiments are only a part of the embodiments of the present application rather than all the embodiments. Based on these embodiments, all other embodiments obtained by one of ordinarily skilled in the art without doing creative work fall within the protection scope of the present application.

In the description of the present application, the orientation or positional relationship indicated by the terms "upper", "lower", "front", "rear", "left", "right", "inside", "outside", etc. is based on the orientation or positional relationship shown in the drawings. It is for the purpose of describing the present application and simplifying the description only and is not intended to indicate or imply that the device or element must have a particular orientation, be constructed, or operate in a particular orientation. Therefore, it should not be construed as a limitation on this application. In addition, the terms "first" or "second" are only used for descriptive purposes, and should not be construed as indicating or implying relative importance or implying the number of indicated technical features. Thus, features delimited with "first" or "second" may expressly or implicitly include one or more of said features. In the description of the present application, "plurality" means two or more, unless otherwise expressly and specifically defined.

The side-view contrast ratio of a current vertical alignment liquid crystal display device is not well. This is mainly caused by the side-view light leakage in the dark state. As the viewing angles of a thin film transistor liquid crystal display device increase, the contrast ratio of images decreases, so the definition of the images reduces. This is because the birefringence of the liquid crystal molecules in the liquid crystal layer changes with observation angles. The present application uses the liquid crystal compensation layer to compensate for the birefringence of the liquid crystal molecules in the liquid crystal layer. The liquid crystal compensation layer adjusts the compensation value through the refractive index difference and thickness of the liquid crystal molecules, so the adjustment range is large and the restriction is small, and it can be matched with the high phase difference of the liquid crystal display panel. Therefore, the dark state side-view light leakage of the liquid crystal display panel is improved, the contrast ratio of the liquid crystal display panel is improved, and the picture quality is enhanced. Furthermore, both sides of the liquid crystal display panel are provided with liquid crystal compensation layers, which can comprehensively achieve a greater compensation effect.

The present application provides a display device, which will be described in detail hereafter. It should be noted that the description order of the following embodiments is not intended to limit the preferred order of the embodiments of the present application.

Please refer to FIG. 1. FIG. 1 is a first structural schematic diagram of a display device 100 provided by the present application. The present application provides a display device 100, which includes a first polarizer 110, a second polarizer 120, and a liquid crystal display panel 130.

The first polarizer 110 and the second polarizer 120 are disposed opposite to each other. The liquid crystal display panel 130 is disposed between the first polarizer 110 and the second polarizer 120, wherein, the first polarizer 110 includes a first liquid crystal compensation layer 111 and the second polarizer 120 includes a second liquid crystal compensation layer 121.

In some embodiments, the first polarizer 110 further includes a first polarizing layer 112, and the first liquid crystal compensation layer 111 is positioned between the first polarizing layer 112 and the liquid crystal display panel 130.

In some embodiments, the second polarizer 120 further includes a second polarizing layer 122, and the second liquid crystal compensation layer 121 is positioned between the second polarizer layer 122 and the liquid crystal display panel 130.

It can be understood that the liquid crystal display panel 130 includes a light incident side and a light-emitting side. In this embodiment, the first polarizer 110 may be used as the light incident side, and the second polarizer 120 may be used as the light light-emitting side. Alternatively, the second polarizer 120 may be used as the light incident side, and the first polarizer 110 may be used as the light-emitting side, which is not limited in the present application.

The absorption axis of the first polarizing layer 112 is set at a first angle, the absorption axis of the second polarizing layer 122 is set at a second angle, the first angle is one of 90 or 0 degrees, and the second angle is another one of the 90 or 0 degrees. The material of the first polarizing layer 112 and the second polarizing layer 122 is polyvinyl alcohol film, and the polyvinyl alcohol film has the characteristics of high temperature and humidity resistance. The temperature and humidity resistance of the polyvinyl alcohol film can be achieved by adjusting the formula, stretching ratio, and stretching rate of the polyvinyl alcohol iodine solution to achieve high temperature and humidity resistance. In this way, the whole polarizer has the characteristics of high temperature and humidity resistance. Specifically, the steps of judging that the polarizer has high temperature and humidity resistance are: For high temperature resistance, take a polarizer sample with a size of 40×40 mm, attach it to clean glass with a roller, and place it under an environment of 80° C., 5 kgf/cm². After 15 minutes, determine whether the high temperature resistance at 80° C. for 500 hours meets the specification. For high humidity resistance, take a polarizer sample with a size of 40×40 mm, attach it to clean glass with a roller, and place it in an environment of 80° C., 5 kgf/cm² for 15 minutes. After 15 minutes, it is judged whether the humidity resistance at 60° C. and 90% RH (humidity) for 500 hours meet the specification, where the specification is that the change rate of the polarizer's monomer penetration is <5%.

Please refer to FIG. 1, and it can be understood that the display device 100 includes an upper polarizer and a lower polarizer. The first polarizer 110 is an upper polarizer or a lower polarizer, and the second polarizer 120 is a lower polarizer or an upper polarizer. Specifically, in this embodiment, the first polarizer 110 is an upper polarizer, and the second polarizer 120 is a lower polarizer.

Wherein, the first liquid crystal compensation layer 111 and the second liquid crystal compensation layer 121 include liquid crystal polymers. Compared with the molecular structure of ordinary photoelectric liquid crystal molecules, in addition to liquid crystal molecules, liquid crystal polymers also have one or more reactive functional groups at the ends of the liquid crystal molecules. The above combination can be photopolymerized into a polymer network, ie, a liquid crystal polymer. Since most of the polymerization initiators used are ultraviolet-sensitive (wavelength ranges from 254 to 365 nm), they are also called ultraviolet-reactive liquid crystals.

Traditional optical films are mostly made of polymers that are extended uniaxially or biaxially. The original homotropy of the random arrangement of molecular axes will be deflected to anisotropy with the extension direction. As a result, the traveling speed of the incident light in different directions is different, that is, the phase delay phenomenon, which can be applied to adjust or compensate the phase of the light.

Generally, the phase delay amount can be obtained by multiplying the difference of the biaxial refractive index ($\Delta_n$) of the film by the thickness of the film (d), that is, $R=\Delta_n d$. Whether rod-shaped or disc-shaped liquid crystal molecules, the overall anisotropy depends on their arrangement. Basically, the birefringence of the liquid crystal is about 0.1, and the birefringence is ten times or even a hundred times that of the traditional polymer stretch film. Therefore, the thickness of the optical film produced by the liquid crystal molecules can be very small, which is very suitable for the roll-to-roll coating process.

Wherein, in some embodiments, the first liquid crystal compensation layer 111 and the second liquid crystal compensation layer 121 are formed by a coating process. Common coating methods include wire bar coating, extrusion coating, direct gravure coating, reverse gravure coating, and die coating. Specifically, the coating process is as follows: A layer of an alignment film is formed on the substrate, the alignment film is subjected to rubbing alignment treatment, and then the liquid crystal polymer is coated on the alignment film for alignment.

In addition, the formation process of the first liquid crystal compensation layer 111 and the second liquid crystal compensation layer 121 may also be as follows: The liquid crystal polymer is formed on the substrate, and then the liquid crystal polymer is cured and aligned by ultraviolet light. The process is quite simple and fast.

In some embodiments, the birefringence difference of the liquid crystal molecules in the liquid crystal polymer ranges from 0.05 to 0.15. The high birefringence difference of the liquid crystal molecules can have a better compensation effect under the same thickness, so that the thickness of the liquid crystal polymer can be effectively reduced, thereby reducing the thickness of the display panel.

In some embodiments, the thickness of the liquid crystal polymer ranges from 0.01 microns to 3 microns. The thickness of the liquid crystal polymer can be determined according to the characteristics of the specific liquid crystal display panel, and the birefringence of the liquid crystal molecules in the liquid crystal layer of the display panel can be completely compensated by adjusting the thickness of the liquid crystal polymer.

In the present application, a liquid crystal compensation layer is respectively provided between the first polarizing layer 112 and the second polarizing layer 122 and the liquid crystal display panel 130. The birefringence of the liquid crystal molecules in the liquid crystal layer is compensated by the liquid crystal compensation layer. The improvement of compensation value is not realized by stretching the liquid crystal compensation layer but by adjusting the refractive index difference and thickness of the liquid crystal molecules, so the adjustment range is large, the restriction is small, and it can be matched with the high phase difference of the liquid crystal display panel 130. Therefore, the dark state side-view light leakage of the liquid crystal display panel 130 and the contrast ratio of the liquid crystal display panel 130 are improved, and the image quality is enhanced. Furthermore, both sides of the liquid crystal display panel 130 are provided with liquid crystal compensation layers, which comprehensively achieves a greater compensation effect.

Figure 2:
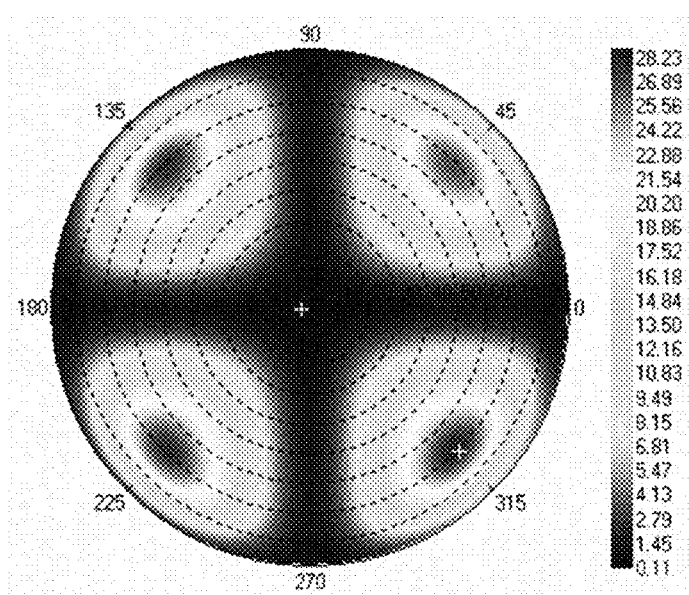
FIG. 2 is a light leakage effect diagram of a dark state viewing angle of a current display device.
Figure 3:
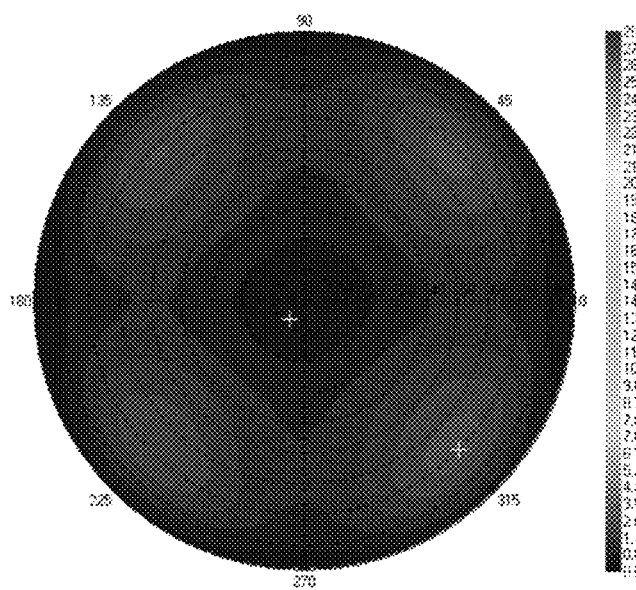
FIG. 3 is a light leakage effect diagram of a dark state viewing angle of a display device in the present application.

Please refer to FIG. 2 and FIG. 3. FIG. 2 is a light leakage effect diagram of a dark state viewing angle of a current display device 100. FIG. 3 is a light leakage effect diagram of a dark state viewing angle of a display device 100 in the present application. Please refer to the following performance comparison table. By comparison, it is known that the maximum value of the light leakage from the dark state viewing angle of the current display device 100 is 28 nits, while the maximum value of the light leakage from the dark state viewing angle of the display device 100 of the present application is 2.3 nits. That is, the present application can greatly improve the dark state side-view light leakage of the liquid crystal display, improve the contrast ratio of the liquid crystal display, and improve the image quality.

Effect comparison table

|  | Current display device | Display device of the present application |
|---|---|---|
| Maximum light leakage value at dark viewing angle | 28 nits | 2.3 nits |

Further, in some embodiments, the display device 100 further includes a first pressure-sensitive adhesive layer 140 attached to a side of the liquid crystal display panel 130 close to the first polarizing layer 112 and a second pressure-sensitive adhesive layer 150 attached to a side of the liquid crystal display panel 130 close to the second polarizing layer 122. By providing a pressure-sensitive adhesive layer as the adhesive between the liquid crystal display panel 130 and other layers, and applying slight pressure to the pressure-sensitive adhesive, a good fixing effect can be achieved in a short time. The advantage is that it can quickly wet the contact surface like a fluid, and when peeled off, it can prevent peeling like a solid. It should be noted that, as another embodiment of the present invention, the pressure-sensitive adhesive may not be included. Wherein, the first pressure-sensitive adhesive layer 140 and the second pressure-sensitive adhesive layer 150 are both polypropylene-based adhesives.

Furthermore, in some embodiments, the first polarizer 110 further includes a first protective layer 113 positioned on a side of the first polarizing layer 112 away from the liquid crystal display panel 130. The second polarizer 120 further includes a second protective layer 123 positioned on a side of the second polarizer 122 away from the liquid crystal display panel 130. Wherein, the material of the first protective layer 113 and the second protective layer 123 is any one of cellulose triacetate, polymethyl methacrylate, or polyethylene terephthalate. The first protective layer 113 and the second protective layer 123 serve as protective layers of the polarizing layer, have the function of isolating water vapor while serving as a support for the entire polarizer.

Figure 4:
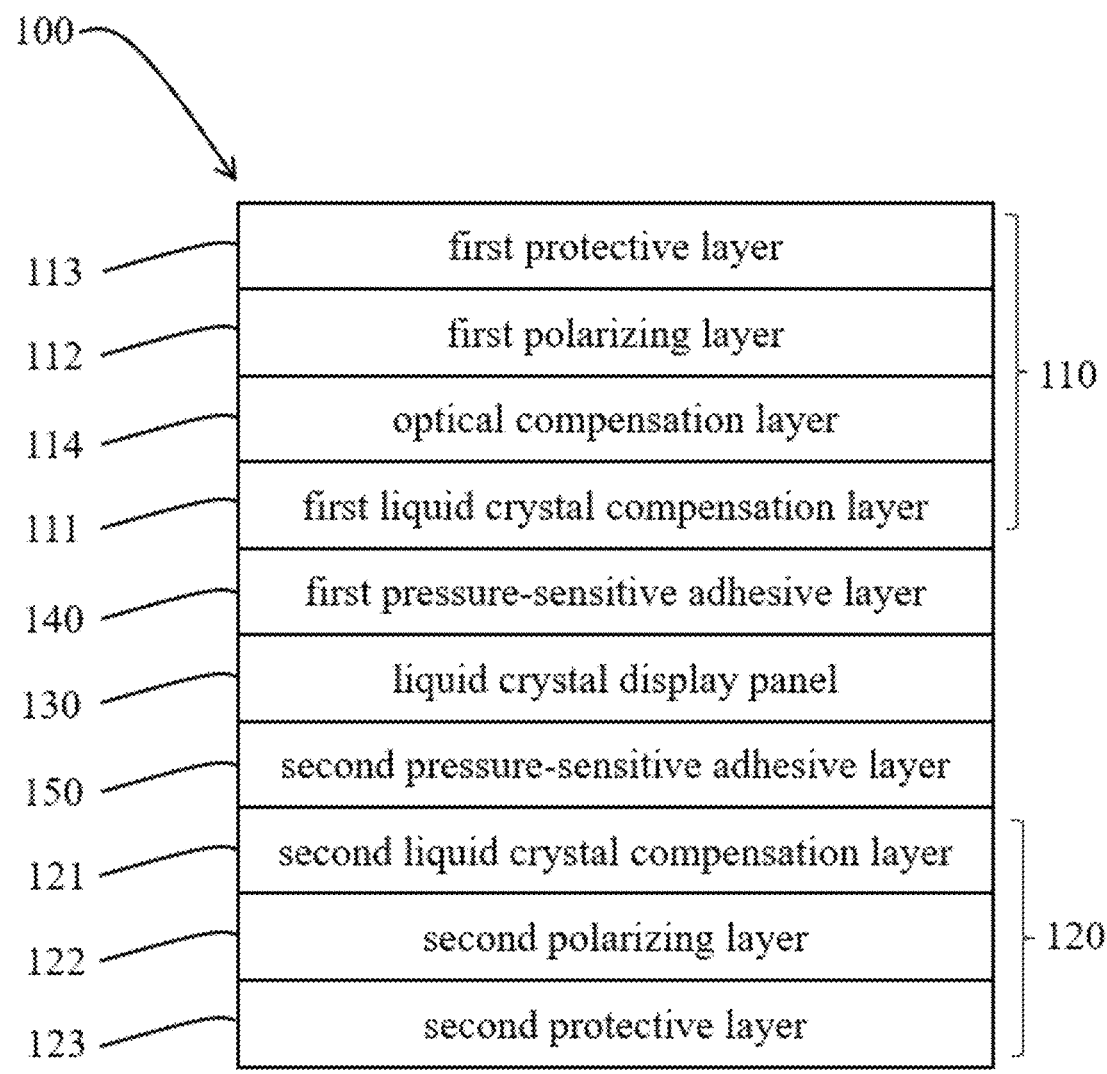
FIG. 4 is a second structural schematic diagram of a display device provided by the present application.

Please refer to FIG. 4. FIG. 4 is a second structural schematic diagram of a display device 100 provided by the present application. The difference between this embodiment and the embodiment shown in FIG. 1 is that the first polarizer 110 further includes an optical compensation layer 114. The optical compensation layer 114 is positioned between the first polarizer layer 112 and the liquid crystal display panel 130.

In the present application, a liquid crystal compensation layer is provided on both sides of the liquid crystal display panel 130 to compensate the birefringence of liquid crystal molecules in the liquid crystal layer, and an optical compensation layer 114 is arranged between the first polarizing layer 112 and the liquid crystal display panel 130. The birefringence of the liquid crystal molecules in the liquid crystal layer is further compensated by the optical compensation layer 114. The compensation principle of the optical compensation layer 114 is generally to correct the phase difference generated by the liquid crystal at different viewing angles so that the birefringence properties of the liquid crystal molecules can be symmetrically compensated.

The optical compensation layer 114 includes a single optical axis compensation film or a dual optical axis compensation film, and the single optical axis compensation film is an anisotropic birefringent film with only one optical axis. The dual optical axis compensation film has two optical axes and three refractive indices, and the dual optical axis compensation film has an in-plane phase difference value Ro and an out-of-plane phase difference value $R_{th}$ in the thickness direction.

Specifically, in some embodiments, the optical compensation layer 114 is positioned between the first polarizing layer 112 and the first liquid crystal compensation layer 111. That is, in this embodiment, the first polarizing layer 112, the optical compensation layer 114, and the first liquid crystal compensation layer 111 are stacked in sequence.

Specifically, in this embodiment, the first polarizer 110 is an upper polarizer, and the second polarizer 120 is a lower polarizer.

Figure 5:
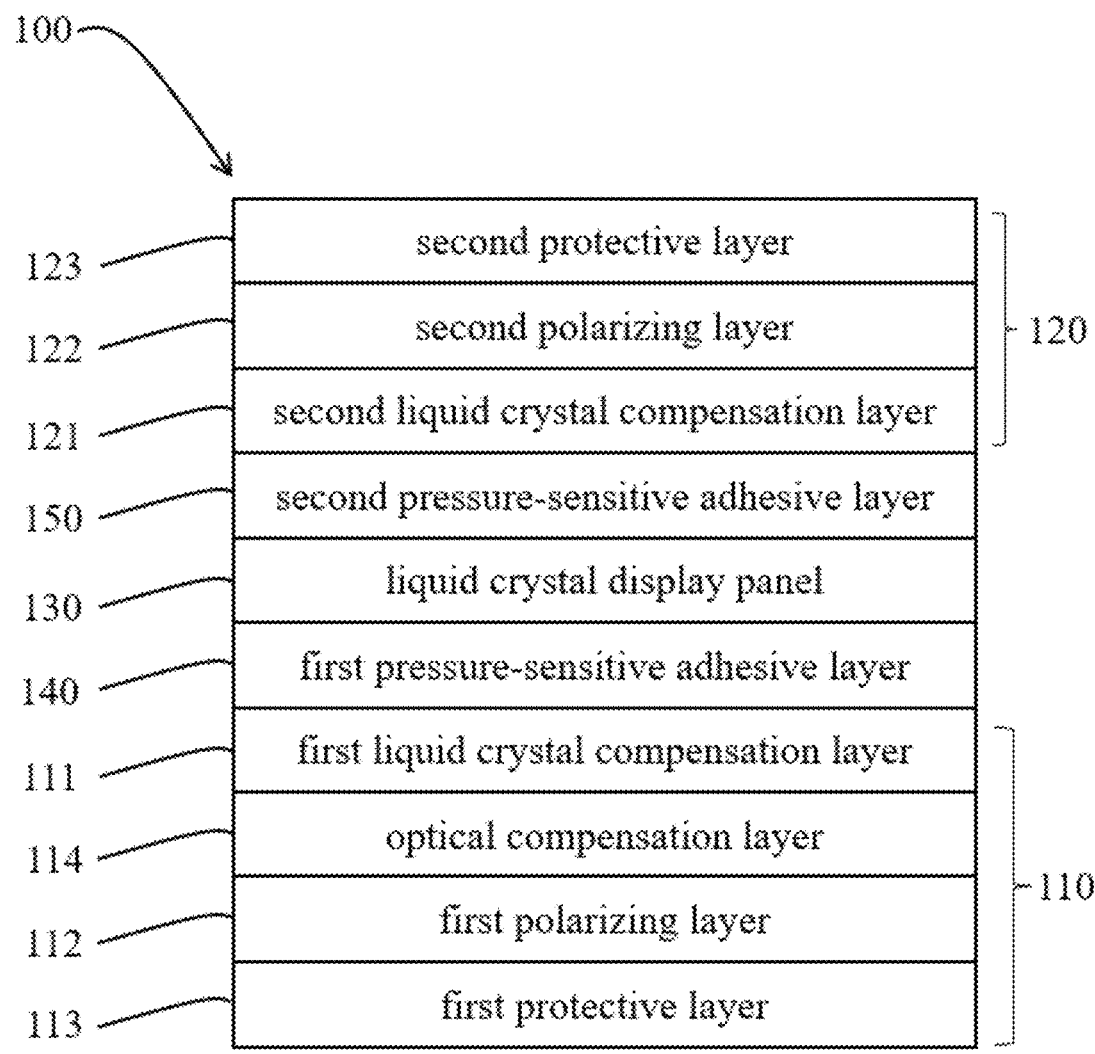
FIG. 5 is a third structural schematic diagram of a display device provided by the present application.

Please refer to FIG. 5. FIG. 5 is a third structural schematic diagram of a display device 100 provided by the present application. The difference between this embodiment and the display device 100 provided by FIG. 4 is that display device 100 includes an upper polarizer and a lower polarizer, the first polarizer 110 is a lower polarizer, and the second polarizer 120 is an upper polarizer.

Figure 6:
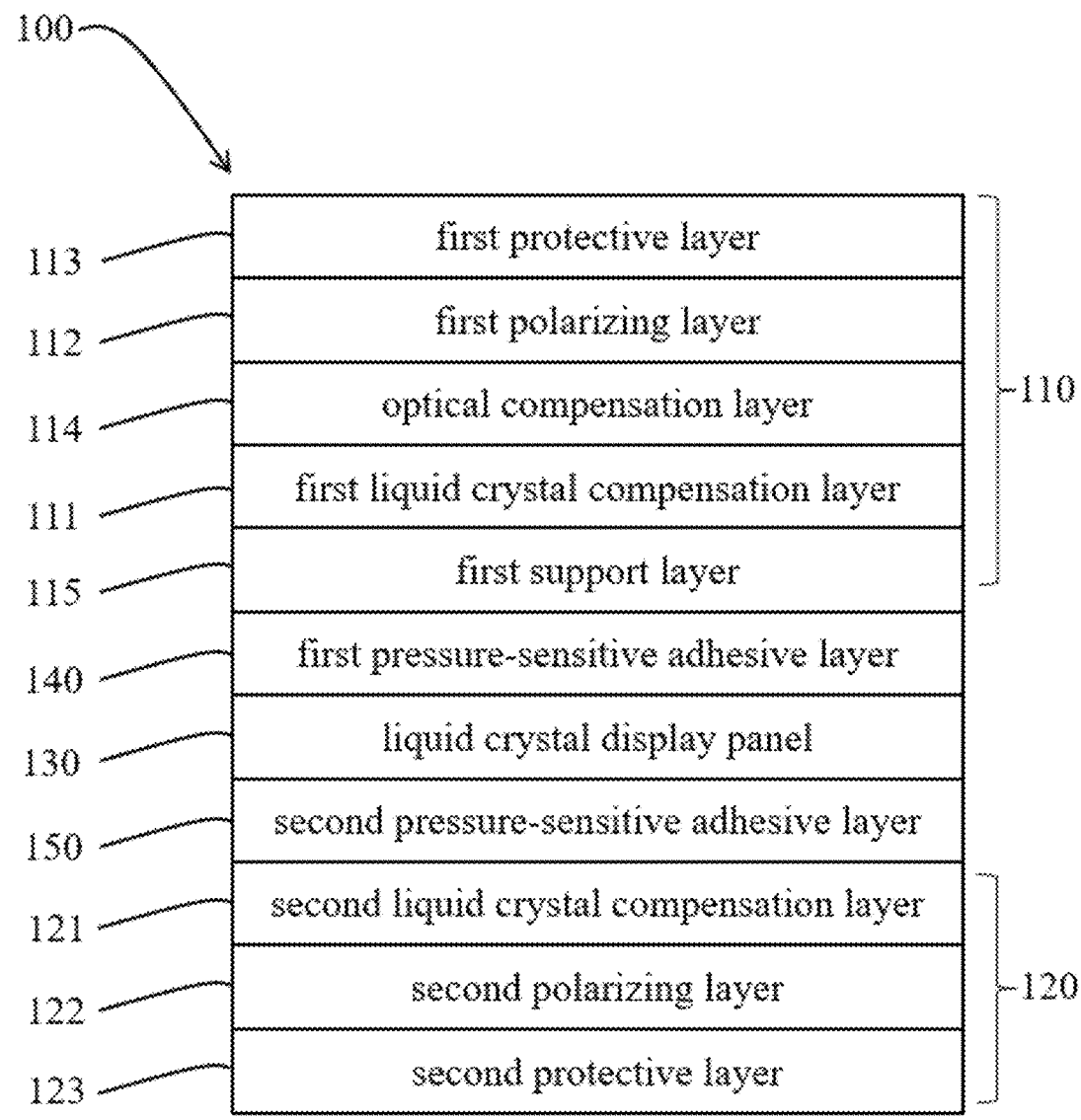
FIG. 6 is a fourth structural schematic diagram of a display device provided by the present application.

Please refer to FIG. 6. FIG. 6 is a fourth structural schematic diagram of a display device provided by the present application. The difference between this embodiment and the embodiment shown in FIG. 4 is that the first polarizer 110 further includes a first support layer 115 positioned between the first liquid crystal compensation layer 111 and the liquid crystal display panel 130.

The first support layer 115 is used to protect and support the first liquid crystal compensation layer 111 and prevent the first liquid crystal compensation layer 111 from shrinking. Specifically, the first support layer 115 is a triacetate cellulose film. Due to its excellent water resistance, low thermal shrinkage, and outstanding durability, triacetate cellulose film has the function of isolating water vapor and can be served as a support layer. Therefore, the first support layer 115 can protect and support the first liquid crystal compensation layer 111 and prevent the first liquid crystal compensation layer 111 from shrinking. Furthermore, the first support layer 115 is a non-compensation layer, no special processing is required, and the manufacturing cost is low.

Specifically, in this embodiment, the first polarizer 110 is an upper polarizer, and the second polarizer 120 is a lower polarizer.

Figure 7:
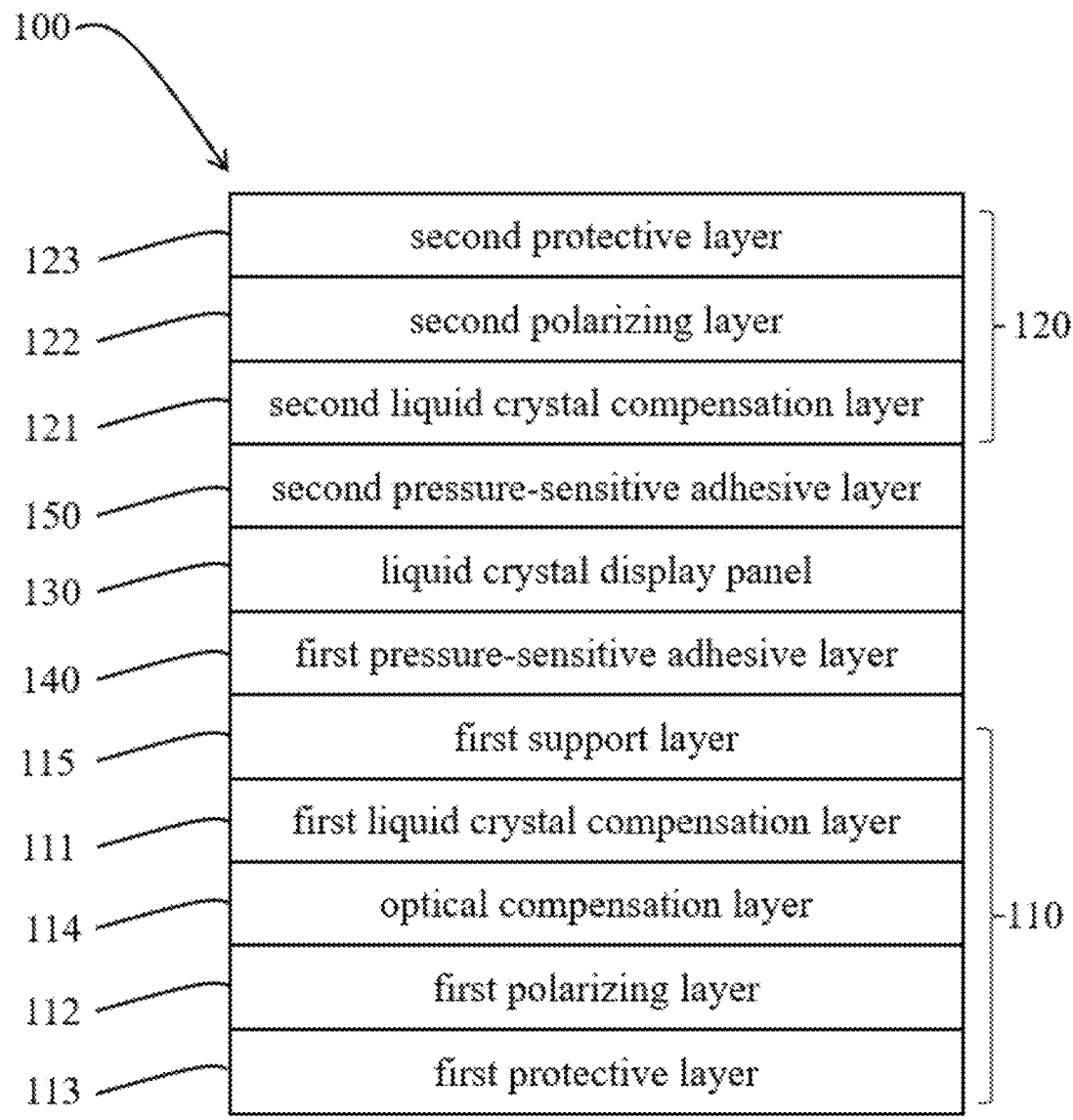
FIG. 7 is a fifth structural schematic diagram of a display device provided by the present application.

Please refer to FIG. 7. FIG. 7 is a fifth structural schematic diagram of a display device 100 provided by the present application. The difference between this embodiment and the display device 100 provided in FIG. 6 is that display device 100 includes an upper polarizer and a lower polarizer, the first polarizer 110 is a lower polarizer, and the second polarizer 120 is an upper polarizer.

Figure 8:
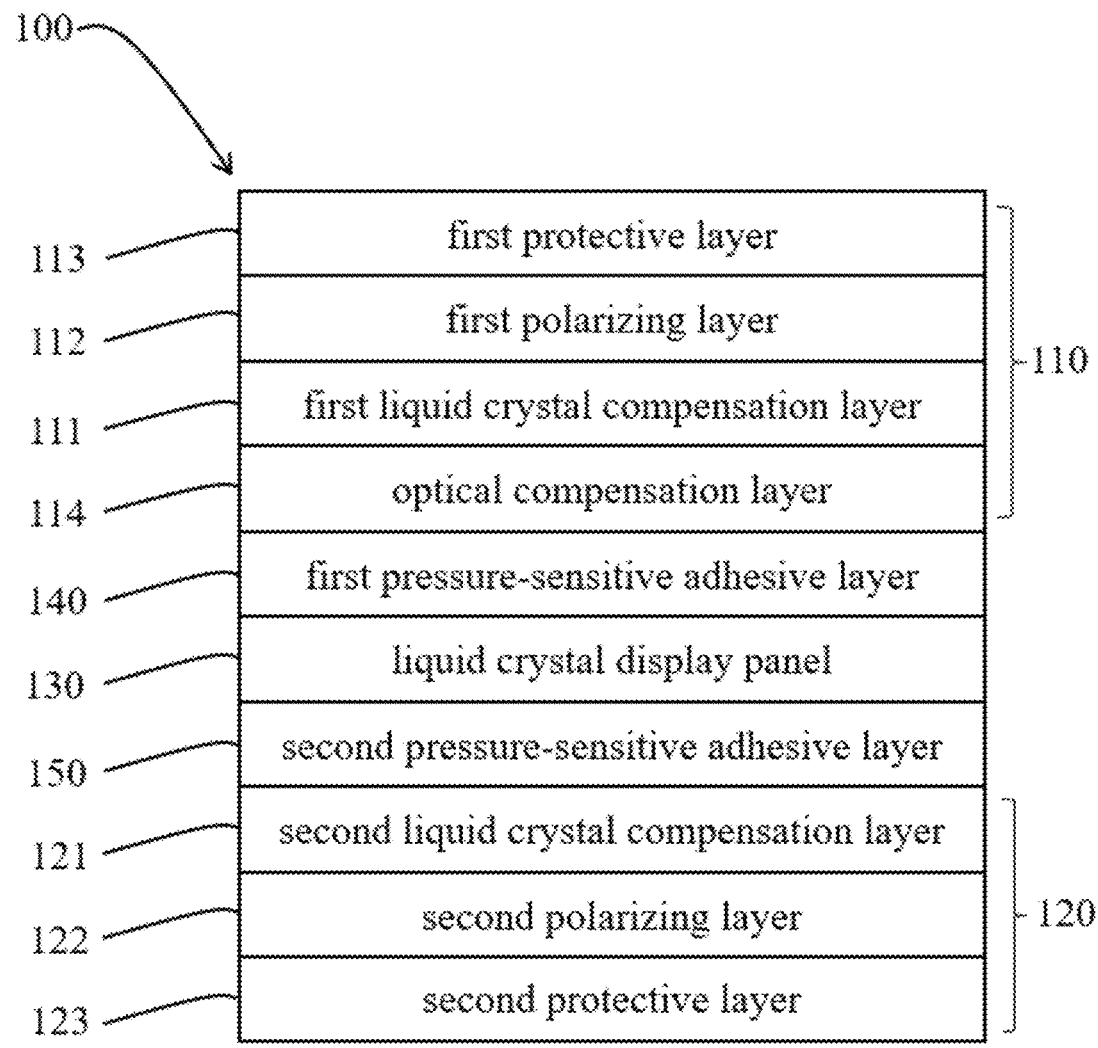
FIG. 8 is a sixth structural schematic diagram of a display device provided by the present application.

Please refer to FIG. 8. FIG. 8 is a sixth structural schematic diagram of a display device 100 provided by the present application. The first liquid crystal compensation layer 111 is positioned between the first polarizing layer 112 and the optical compensation layer 114. That is, in this embodiment, the first polarizing layer 112, the first liquid crystal compensation layer 111, and the optical compensation layer 114 are stacked in sequence.

Specifically, in this embodiment, the first polarizer 110 is an upper polarizer, and the second polarizer 120 is a lower polarizer.

Figure 9:
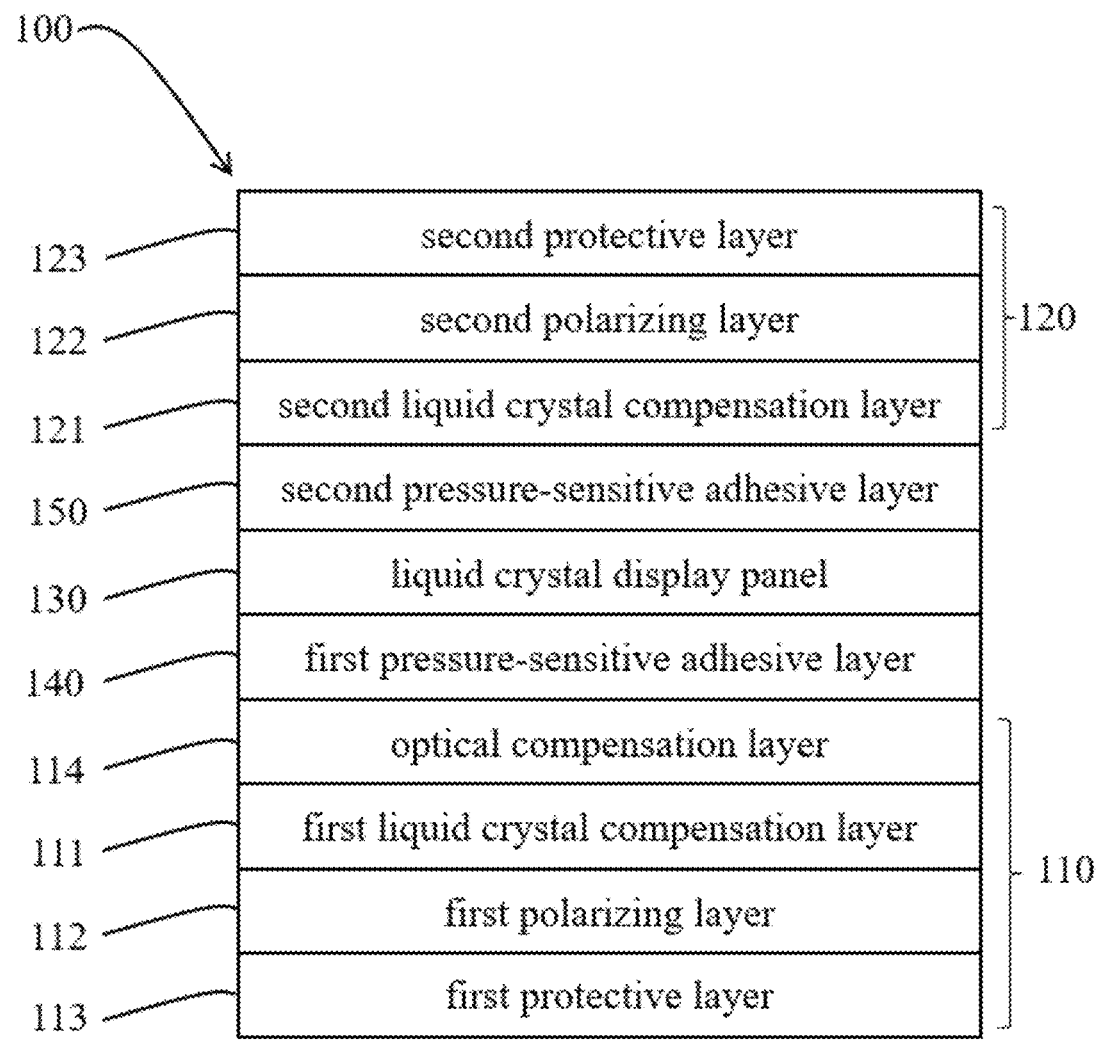
FIG. 9 is a seventh structural schematic diagram of a display device provided by the present application.

Please refer to FIG. 9. FIG. 9 is a seventh structural schematic diagram of a display device 100 provided by the present application. The display device 100 includes an upper polarizer and a lower polarizer, the first polarizer 110 is a lower polarizer, and the second polarizer 120 is an upper polarizer.

Figure 10:
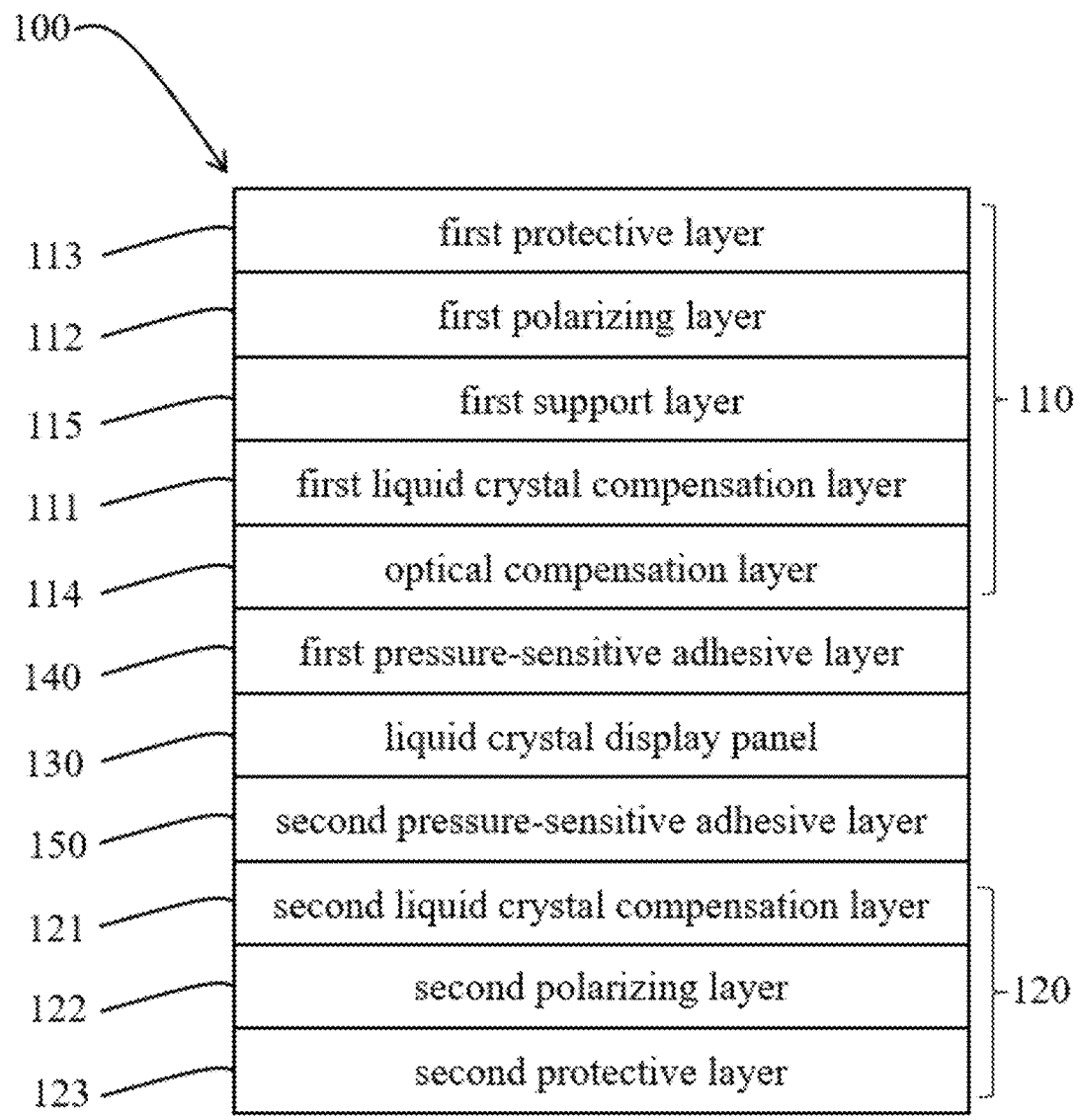
FIG. 10 is an eighth schematic structural diagram of a display device provided by the present application.

Please refer to FIG. 10. FIG. 10 is an eighth schematic structural diagram of a display device 100 provided by the present application. The first polarizer 110 further includes a first support layer 115. The first support layer 115 is positioned between the first polarizing layer 112 and the first liquid crystal compensation layer 111.

The first support layer 115 is used to protect and support the first polarizing layer 112 and prevent the first polarizing layer 112 from shrinking. Specifically, the first support layer 115 is a triacetate cellulose film. Due to its excellent water resistance, low thermal shrinkage, and outstanding durability, triacetate cellulose film has the function of isolating water vapor and can be served as a support layer. Therefore, the first support layer 115 can protect and support the first polarizing layer 112 and prevent the first polarizing layer 112 from shrinking. Furthermore, the first support layer 115 is a non-compensation layer, no special processing is required, and the manufacturing cost is low.

Specifically, in this embodiment, the first polarizer 110 is an upper polarizer, and the second polarizer 120 is a lower polarizer.

Figure 11:
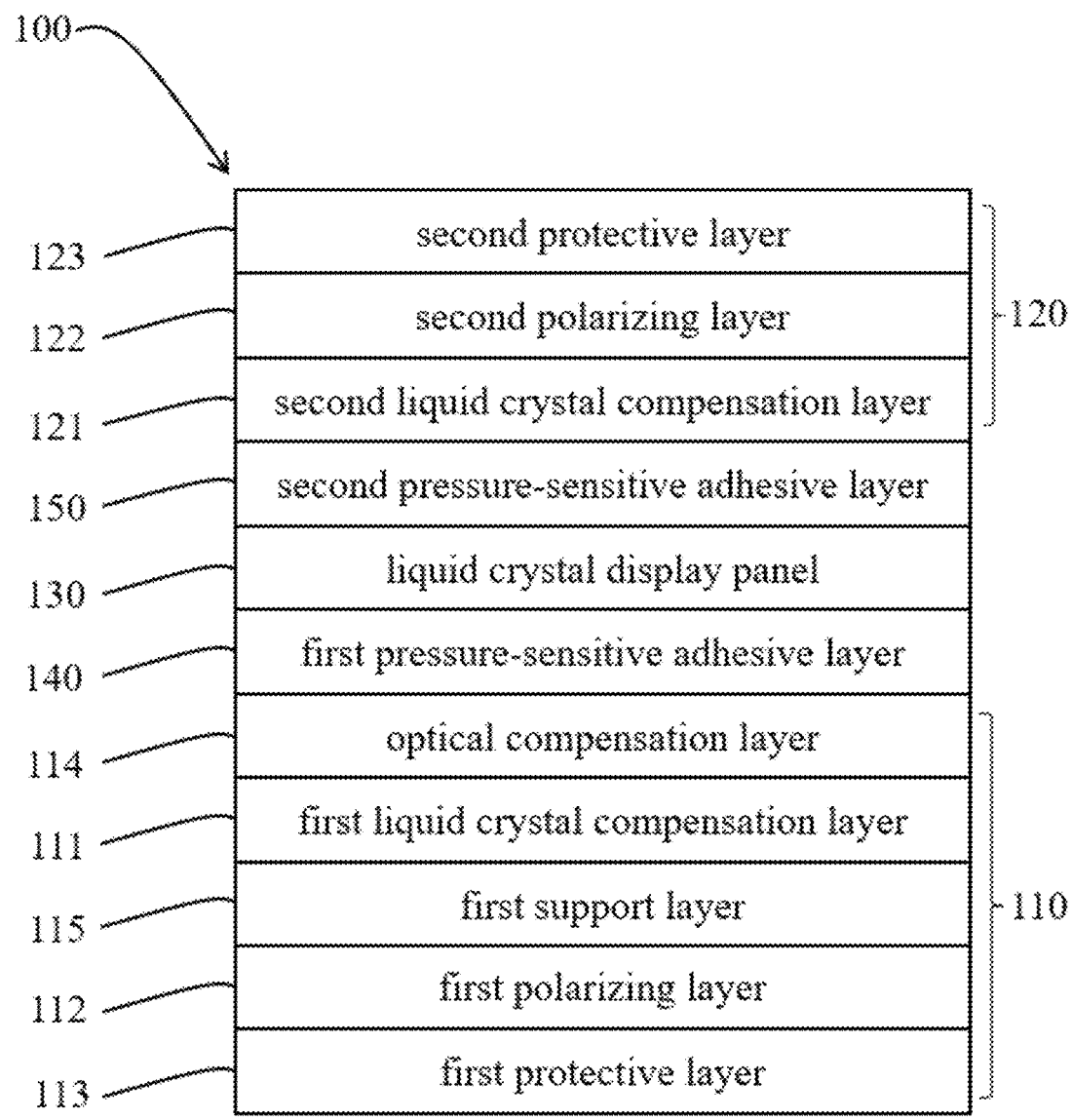
FIG. 11 is a ninth structural schematic diagram of a display device provided by the present application.

Please refer to FIG. 11. FIG. 11 is a ninth structural schematic diagram of a display device provided by the present application. The difference between this embodiment and the display device 100 provided in FIG. 10 is that display device 100 includes an upper polarizer and a lower polarizer, the first polarizer 110 is a lower polarizer, and the second polarizer 120 is an upper polarizer.

Figure 12:
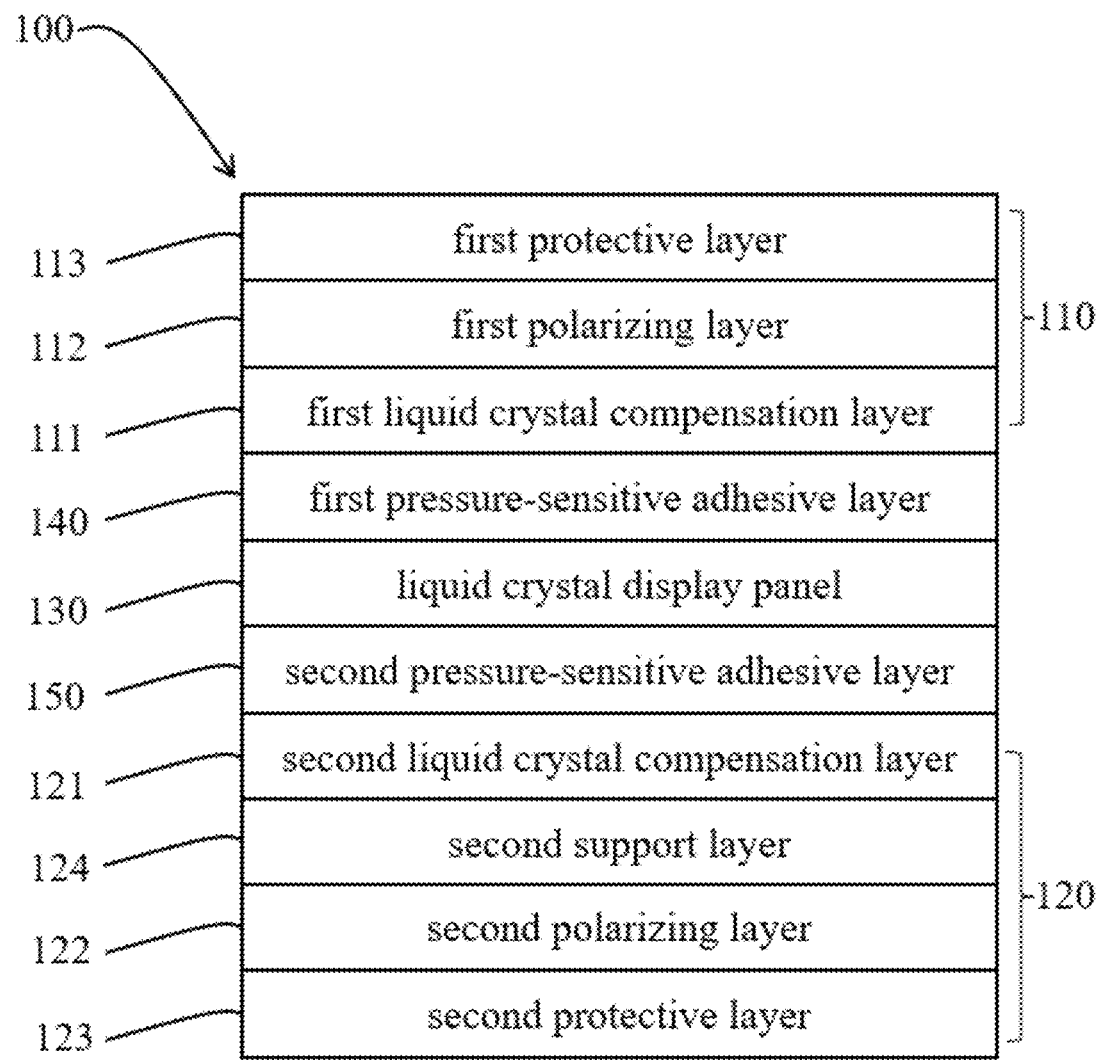
FIG. 12 is a tenth structural schematic diagram of a display device provided by the present application.

Please refer to FIG. 12. FIG. 12 is a tenth structural schematic diagram of a display device provided by the present application. The difference between this embodiment and the embodiment shown in FIG. 1 is that the second polarizer 120 further includes a second support layer 124 positioned between the second polarizer layer 122 and the second liquid crystal compensation layer 121.

The second support layer 124 is used to protect and support the second polarizing layer 122 and prevent the second polarizing layer 122 from shrinking. Specifically, the second support layer 124 is a triacetate cellulose film. Due to its excellent water resistance, low thermal shrinkage, and outstanding durability, triacetate cellulose film has the function of isolating water vapor and can be served as a support layer. Therefore, the second support layer 124 can protect and support the second polarizing layer 122 and prevent the second polarizing layer 122 from shrinking. Furthermore, the second support layer 124 is a non-compensation layer, no special processing is required, and the manufacturing cost is low.

Specifically, in this embodiment, the first polarizer 110 is an upper polarizer, and the second polarizer 120 is a lower polarizer.

Figure 13:
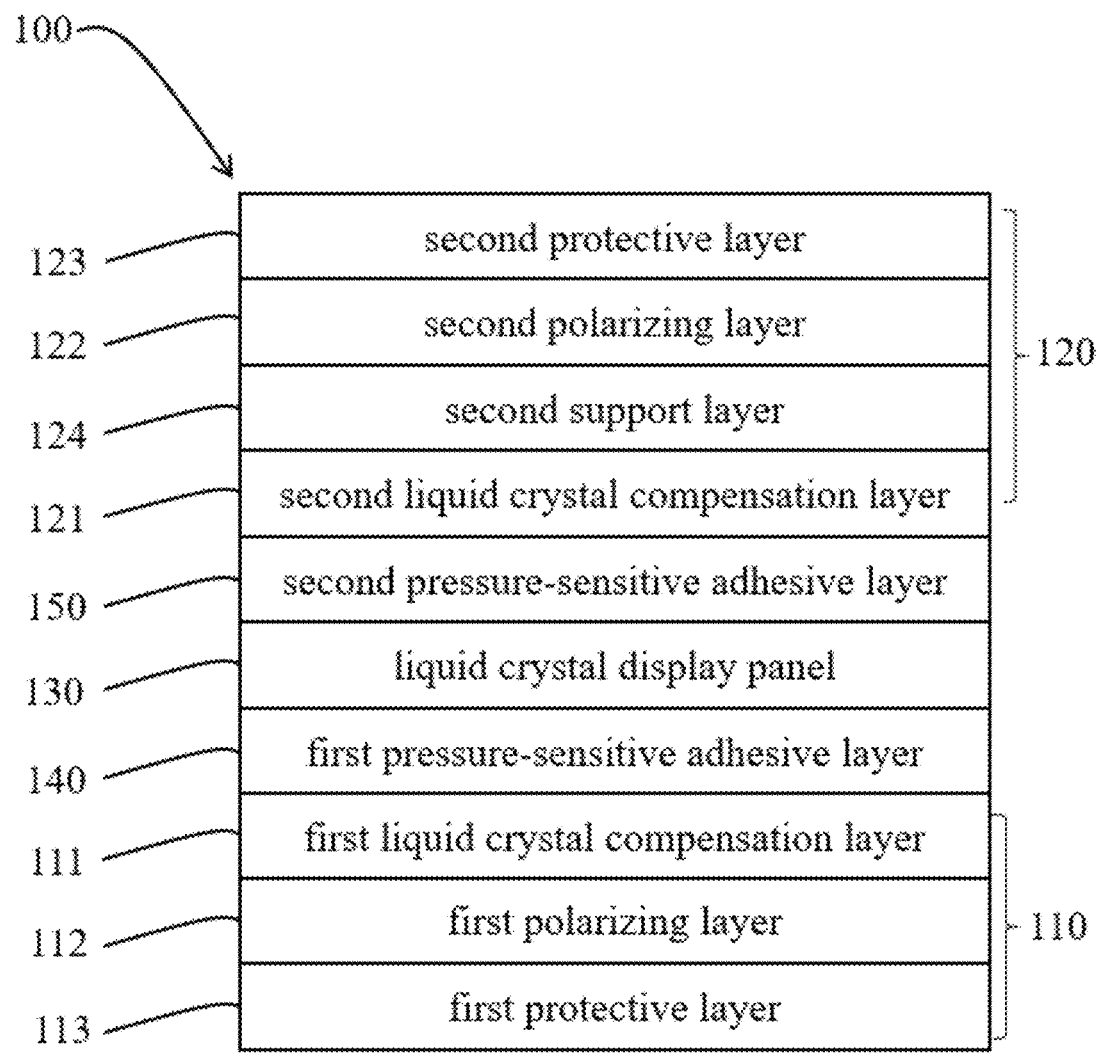
FIG. 13 is an eleventh structural schematic diagram of a display device provided by the present application.

Please refer to FIG. 13. FIG. 13 is an eleventh structural schematic diagram of a display device 100 provided by the present application. The difference between this embodiment and the display device 100 provided in FIG. 12 is that display device 100 includes an upper polarizer and a lower polarizer, the first polarizer 110 is a lower polarizer, and the second polarizer 120 is an upper polarizer.

Figure 14:
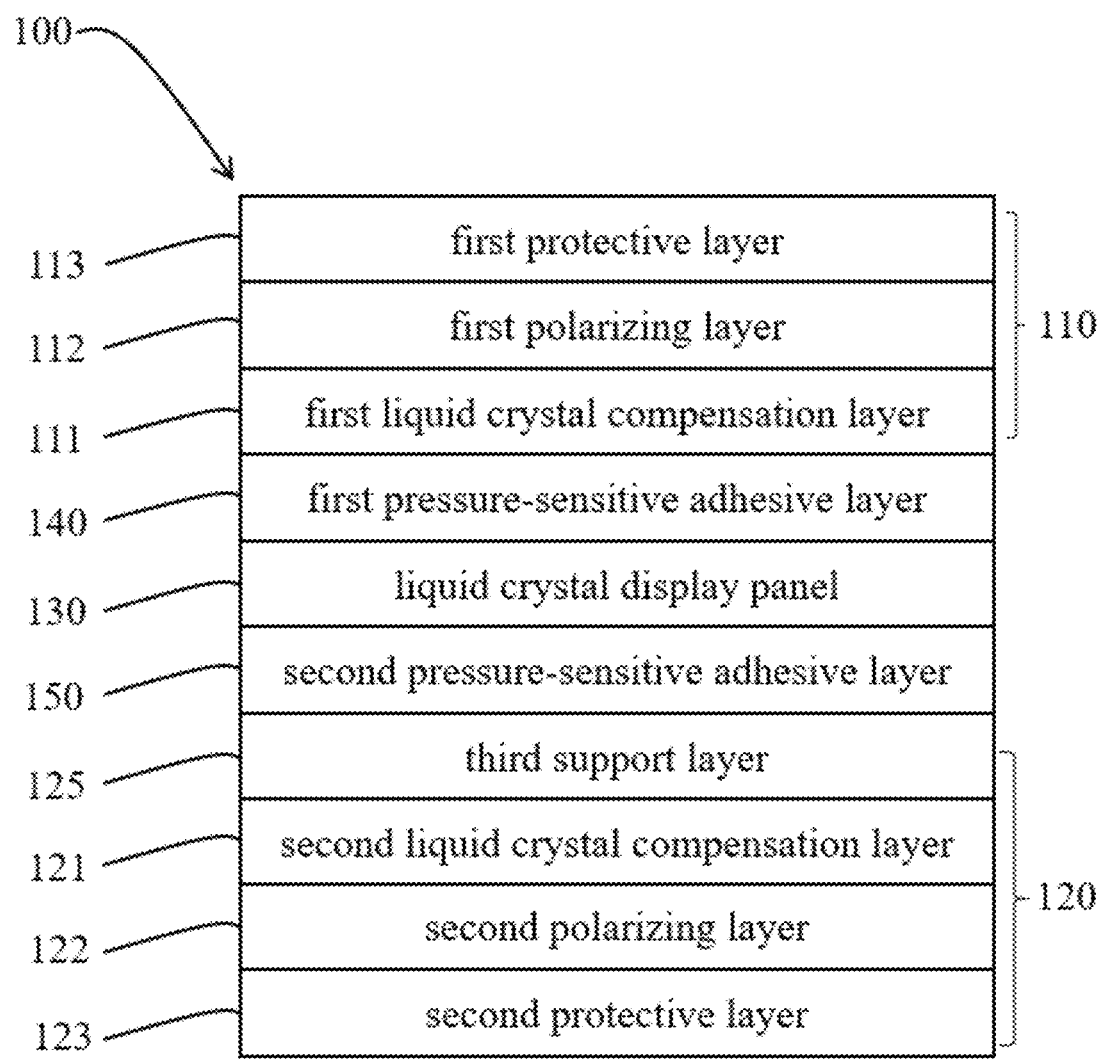
FIG. 14 is a twelfth structural schematic diagram of a display device provided by the present application.

Please refer to FIG. 14. FIG. 14 is a twelfth structural schematic diagram of a display device provided by the present application. The difference between this embodiment and the embodiment shown in FIG. 1 is that the second polarizer 120 further includes a third support layer 125 positioned between the second liquid crystal compensation layer 121 and the liquid crystal display panel 130.

The third support layer 125 is used to protect and support the second liquid crystal compensation layer 121 and prevent the second liquid crystal compensation layer 121 from shrinking. Specifically, the third support layer 125 is a triacetate cellulose film. Due to its excellent water resistance, low thermal shrinkage, and outstanding durability, triacetate cellulose film has the function of isolating water vapor and can be served as a support layer. Therefore, the third support layer 125 can protect and support the second liquid crystal compensation layer 121 and prevent the second liquid crystal compensation layer 121 from shrinking. Furthermore, the third support layer 125 is a non-compensation layer, no special processing is required, and the manufacturing cost is low.

Specifically, in this embodiment, the first polarizer 110 is an upper polarizer, and the second polarizer 120 is a lower polarizer.

Figure 15:
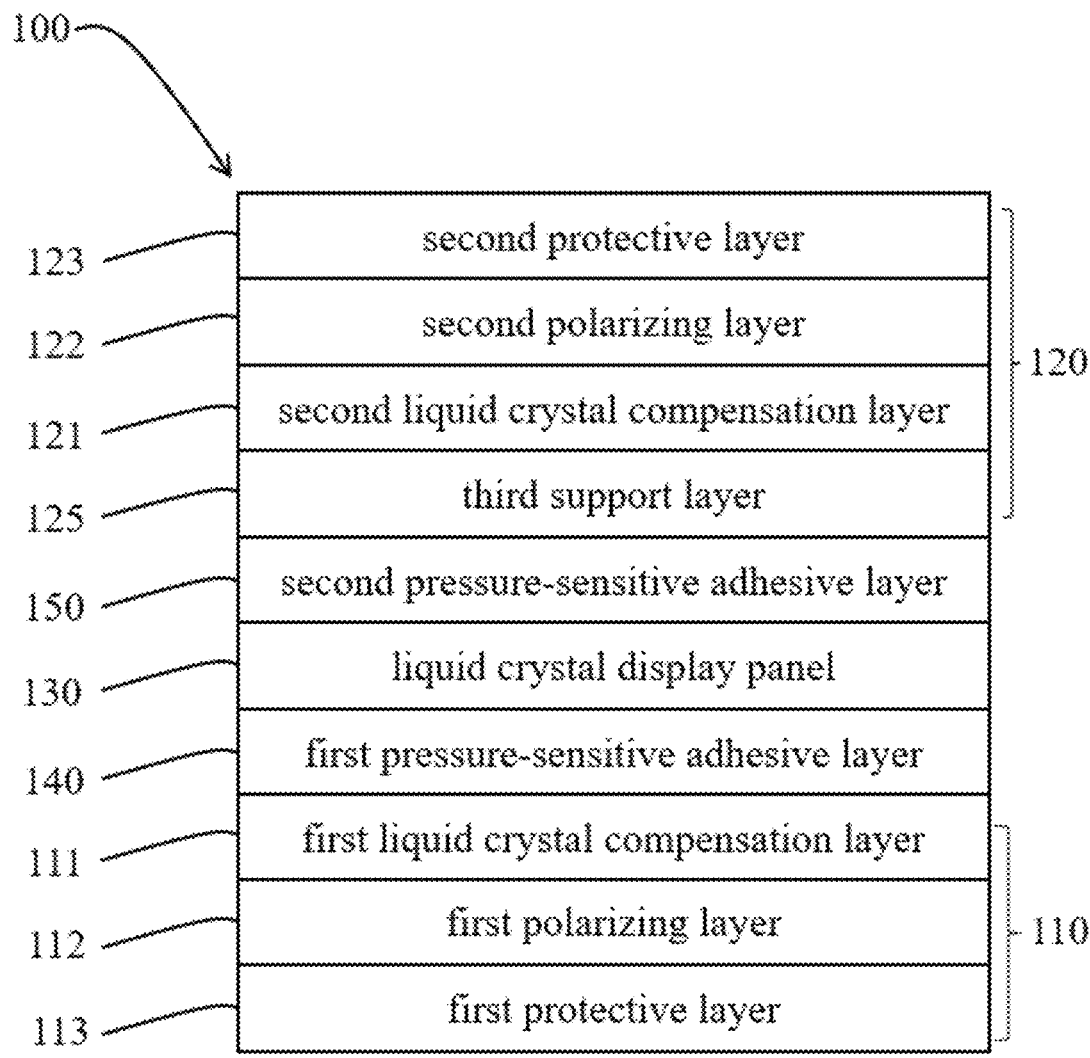
FIG. 15 is a thirteenth structural schematic diagram of a display device provided by the present application.

Please refer to FIG. 15. FIG. 15 is a thirteenth structural schematic diagram of a display device provided by the present application. The difference between this embodiment and the display device 100 provided in FIG. 14 is that display device 100 includes an upper polarizer and a lower polarizer, the first polarizer 110 is a lower polarizer, and the second polarizer 120 is an upper polarizer.

A display device provided by the embodiments of the present application has been introduced in detail above, and the principles and implementations of the present application are described with specific examples herein. The descriptions of the embodiments are only to help understand the method of the present application and its core idea. Meanwhile, for one of ordinarily skilled in the art, based on the idea of the present application, there will be changes in the specific embodiments and the scope of the present application. In conclusion, the content of this specification should not be construed as a limitation on this application.

What is claimed is:
1. A display device, comprising:
a first polarizer;

a second polarizer, wherein the first polarizer is arranged opposite to the second polarizer; and a liquid crystal display panel arranged between the first polarizer and the second polarizer;

wherein the first polarizer comprises a first liquid crystal compensation layer, and the second polarizer comprises a second liquid crystal compensation layer;

wherein the first polarizer further comprises a first polarizing layer, and the first liquid crystal compensation layer is positioned between the first polarizing layer and the liquid crystal display panel;

wherein the first polarizer further comprises an optical compensation layer positioned between the first polarizing layer and the liquid crystal display panel;

wherein the first liquid crystal compensation layer comprises a liquid crystal polymer, and is configured to compensate for a birefringence of liquid crystal molecules in the liquid crystal display panel based on a birefringence difference of liquid crystal molecules in the liquid crystal polymer and a thickness of the liquid crystal polymer; and wherein the optical compensation layer comprises a single optical axis compensation film or a dual optical axis compensation film, and is configured to symmetrically compensate for the birefringence of the liquid crystal molecules in the liquid crystal display panel by correcting a phase difference generated by the liquid crystal molecules in the liquid crystal display panel at different viewing angles.

2. The display device of claim 1, wherein the second polarizer further comprises:

a second polarizing layer, wherein the second liquid crystal compensation layer is positioned between the second polarizing layer and the liquid crystal display panel.

3. The display device of claim 2, wherein the second polarizer further comprises:

a second support layer positioned between the second polarizing layer and the second liquid crystal compensation layer.

4. The display device of claim 1, wherein the optical compensation layer is positioned between the first polarizing layer and the first liquid crystal compensation layer.

5. The display device of claim 4, wherein the first polarizer further comprises:

a first support layer positioned between the first liquid crystal compensation layer and the liquid crystal display panel to protect and support the first liquid crystal compensation layer and prevent the first liquid crystal compensation layer from shrinking, the first support layer comprising a triacetate cellulose film.

6. The display device of claim 1, wherein the first liquid crystal compensation layer is positioned between the first polarizing layer and the optical compensation layer.

7. The display device of claim 6, wherein the first polarizer further comprises:

a first support layer positioned between the first polarizing layer and the first liquid crystal compensation layer.

8. A display device, comprising:

a first polarizer;

a second polarizer, wherein the first polarizer is arranged opposite to the second polarizer; and a liquid crystal display panel arranged between the first polarizer and the second polarizer;

wherein the first polarizer comprises a first liquid crystal compensation layer, and the second polarizer comprises a second liquid crystal compensation layer;

wherein the first polarizer is configured to be a light incident side, and the second polarizer is configured to be a light-emitting side;

wherein the first polarizer further comprises a first polarizing layer, and the first liquid crystal compensation layer is positioned between the first polarizing layer and the liquid crystal display panel;

wherein the first polarizer further comprises an optical compensation layer positioned between the first polarizing layer and the liquid crystal display panel;

wherein the first liquid crystal compensation layer comprises a liquid crystal polymer, and is configured to compensate for a birefringence of liquid crystal molecules in the liquid crystal display panel based on a birefringence difference of liquid crystal molecules in the liquid crystal polymer and a thickness of the liquid crystal polymer; and wherein the optical compensation layer comprises a single optical axis compensation film or a dual optical axis compensation film, and is configured to symmetrically compensate for the birefringence of the liquid crystal molecules in the liquid crystal display panel by correcting a phase difference generated by the liquid crystal molecules in the liquid crystal display panel at different viewing angles.

9. The display device of claim 8, wherein the optical compensation layer is positioned between the first polarizing layer and the first liquid crystal compensation layer.

10. The display device of claim 9, wherein the first polarizer further comprises:

a first support layer positioned between the first liquid crystal compensation layer and the liquid crystal display panel to protect and support the first liquid crystal compensation layer and prevent the first liquid crystal compensation layer from shrinking, the first support layer comprising a triacetate cellulose film.

11. The display device of claim 8, wherein the first liquid crystal compensation layer is positioned between the first polarizing layer and the optical compensation layer.

12. The display device of claim 11, wherein the first polarizer further comprises:

a first support layer positioned between the first polarizing layer and the first liquid crystal compensation layer.

* * * * *